(12) United States Patent
Gage et al.

(10) Patent No.: US 8,807,081 B1
(45) Date of Patent: Aug. 19, 2014

(54) BIRDFEEDER HAVING MAGNETIC WEIGHTED PERCH BAR

(71) Applicants: Steven Keith Gage, Wheaton, IL (US); Steve Wong, Hong Kong (CN)

(72) Inventors: Steven Keith Gage, Wheaton, IL (US); Steve Wong, Hong Kong (CN)

(73) Assignee: Akerue Industries, LLC, Antioch, IL (US)

( * ) Notice: Subject to any disclaimer, the term of this patent is extended or adjusted under 35 U.S.C. 154(b) by 0 days.

(21) Appl. No.: 13/964,041

(22) Filed: Aug. 10, 2013

(51) Int. Cl.
*A01K 31/12* (2006.01)

(52) U.S. Cl.
USPC .......................................... 119/52.3; 119/52.4

(58) Field of Classification Search
CPC ............................ A01K 31/12; A01K 39/0113
USPC ............ 119/52.3, 57.8, 57.9, 52.2, 52.4, 429, 119/61.57, 63
See application file for complete search history.

(56) References Cited

U.S. PATENT DOCUMENTS

| | | | | |
|---|---|---|---|---|
| 5,826,540 A | * | 10/1998 | Bridges | 119/52.3 |
| 7,694,652 B2 | * | 4/2010 | Fahey | 119/52.3 |
| 2012/0037080 A1 | * | 2/2012 | Hepp et al. | 119/52.3 |

* cited by examiner

*Primary Examiner* — Yvonne Abbott
(74) *Attorney, Agent, or Firm* — Justin Lampel

(57) ABSTRACT

A birdfeeder which operates with a perch that is controlled by the use of magnetic force that allows certain smaller birds to freely feed while inhibiting larger birds and small animals, such as squirrels, from feeding is provided. The birdfeeder has a plurality of movable pivoted perches which move from a first position to a second position. In the first (horizontal) position, a small bird may sit on the movable perch and reach an opening in a food hopper while the weight of a larger bird or animal will force the movable perch downward into the second (non-horizontal) position wherein the perch is moved away from the opening in the food hopper. A magnet located on an end of the movable perch secures the perch in the first position until the weight of a larger bird or animal causes the movable perch to pivot to the non-horizontal position.

12 Claims, 5 Drawing Sheets

BIRDFEEDER HAVING MAGNETIC WEIGHTED PERCH BAR

BACKGROUND OF THE INVENTION

A birdfeeder which operates with a perch that is controlled by the use of magnetic force that allows certain smaller birds to freely feed while inhibiting larger birds and small animals, such as squirrels, from feeding is provided. The birdfeeder has a plurality of movable pivoted perches which move from a first position to a second position. In the first (horizontal) position, a small bird may sit on the movable perch and reach an opening in a food hopper while the weight of a larger bird or animal will force the movable perch downward into the second position wherein the perch is moved away from the opening in the food hopper. A magnet located on an end of the movable perch secures the perch in the first position until the weight of a larger bird or animal causes the movable perch to pivot to the non-horizontal position.

Attempts have been made to provide improved birdfeeder wherein smaller birds may feed while larger birds and other heavier animals are prevented from feeding. For example, U.S. Pat. No. 6,192,832 to Husnik discloses a fully rotatable squirrel proof bird feeder for dislodging and preventing unwanted animals comprising a horizontal shaft with rotatable end sleeves, a seed receptacle with feed portals disposed midpoint and fixed to the shaft, and a counter-weighted shell comprising a window opening, weather awning, and rotatable perch assembly. The shell is mounted fully rotatable on the shaft closely surrounding the seed receptacle. Vertical braces fixed to the shaft ends prevent axial rotation of the seed receptacle and provide a secure method for hanging. An adjustable counter-weight fixed to the shell permits weight discrimination and biases alignment between the window opening and the feed portals. In the open feeding position, birds of preferential weight land on the perch and pass through the window opening to the feed portals. In the closed rotating position(s), heavier unwanted animals upon the feeder will roll the shell, the shaft sleeves, or the perch clockwise or counterclockwise and either be dislodged or the shell will close off access to the feed portals. An alternate embodiment integrates various features and counterbalance properties by molding the shell body shape and changing the pivot location of the shell.

Further, U.S. Pat. No. 6,050,221 to Eaton discloses a bird feeder that prevents animals such as squirrels, chipmunks, and rodents from gaining access to feed in the bird feeder. The bird feeder protects the feed from wind, rain, and snow. The bird feeder includes a housing that is rotatably attached to a support shaft allowing at least 360 degrees of rotation. The housing includes a plurality of angled plates that cause the housing to spin when the animal contacts one of the plates. A feed tray is rigidly attached to the support shaft and remains upright and stationary within the housing while the housing rotates about the support shaft. A bird can fly through an opening directly to the feed tray. The transparent sides of the housing allow a person to watch the bird.

However, these birdfeeders fail to provide a birdfeeder which utilizes a magnetic perch which rotates around a pivot from a first position to a second position and which allows a user to selectively determine the weight of the bird which may feed from the birdfeeder.

SUMMARY OF THE INVENTION

A birdfeeder which operates with a perch that is controlled by the use of magnetic force that allows certain smaller birds to freely feed while inhibiting larger birds and small animals, such as squirrels, from feeding is provided. The birdfeeder has a plurality of movable pivoted perches which move from a first position to a second position. In the first (horizontal) position, a small bird may sit on the movable perch and reach an opening in a food hopper while the weight of a larger bird or animal will force the movable perch downward into the second (non-horizontal) position wherein the perch is moved away from the opening in the food hopper. A magnet located on an end of the movable perch secures the perch in the first position until the weight of a larger bird or animal causes the movable perch to pivot to the non-horizontal position.

An advantage of the present birdfeeder is that the birdfeeder allows for smaller birds to feed while preventing larger birds and other heavier animals from feeding.

Still another advantage of the present birdfeeder is that the present birdfeeder may have a movable handle section which allows the user to hang the birdfeeder from, for example, a tree or the like.

Yet another advantage of the present birdfeeder is that the present birdfeeder may have a magnet located in a perch which may be changed so as to selectively determine the weight of the bird which may feed on the birdfeeder.

And another advantage of the present birdfeeder is that the present birdfeeder may be durable so as to withstand prolonged exposure to outside elements.

Still another advantage of the present birdfeeder is that the present birdfeeder may have a movable perch which rotates around a pivot point which is secured within a base collar of the birdfeeder.

Yet another advantage of the present birdfeeder is that the present birdfeeder may have an interior base portion which protects the magnet and pivot of the perch of the movable birdfeeder.

For a more complete understanding of the above listed features and advantages of the present birdfeeder having a magnetic weighted perch bar reference should be made to the following detailed description of the preferred embodiments. Further, additional features and advantages of the invention are described in, and will be apparent from, the detailed description of the preferred embodiments.

DETAILED DESCRIPTION OF THE PREFERRED EMBODIMENTS

A birdfeeder which operates with a perch that is controlled by the use of magnetic force that allows certain smaller birds to freely feed while inhibiting larger birds and small animals, such as squirrels, from feeding is provided. The birdfeeder has a plurality of movable pivoted perches which move from a first position to a second position. In the first (horizontal)

position, a small bird may sit on the movable perch and reach an opening in a food hopper while the weight of a larger bird or animal will force the movable perch downward into the second (non-horizontal) position wherein the perch is moved away from the opening in the food hopper. A magnet located on an end of the movable perch secures the perch in the first position until the weight of a larger bird or animal causes the movable perch to pivot to the non-horizontal position.

Figure 1:
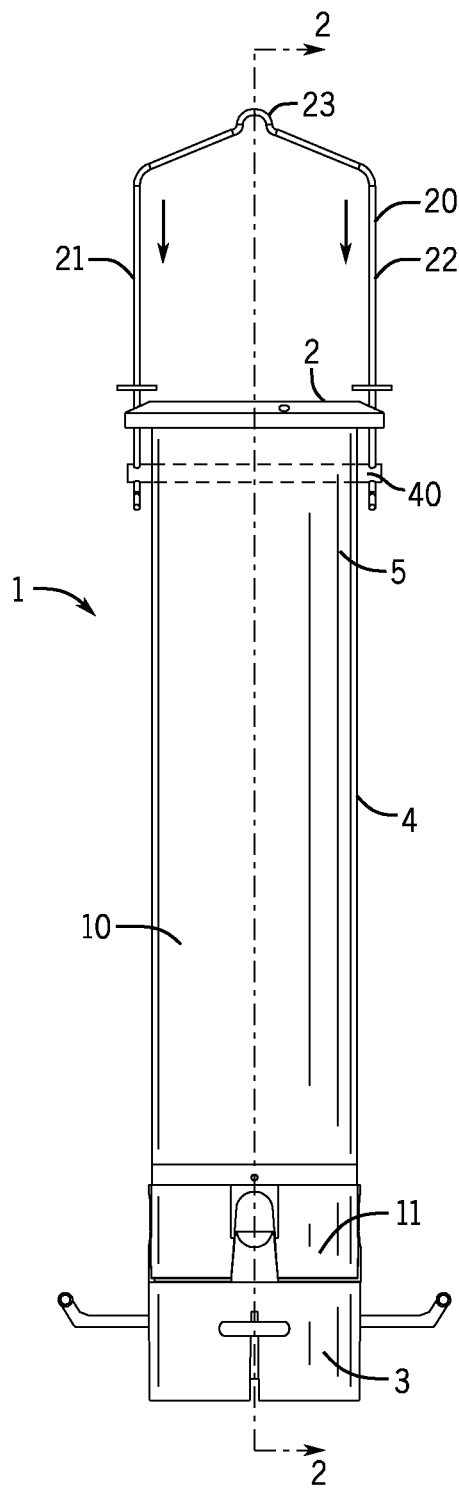
FIG. 1 illustrates a front view of the birdfeeder wherein the movable handle is in the First Position A (horizontal).

Referring now to the drawings wherein like numbers refer to like parts, FIG. 1 generally illustrates a birdfeeder 1. The birdfeeder 1 may have a top 2, a bottom 3, a generally cylindrical side 4 and a generally hollow interior 5. The birdfeeder 1 may have a feed hopper section 10 and a base section 11 wherein the feed hopper section 10 is located above and attached to the base section 11. Further, in an embodiment, the feed hopper section 10 may be substantially greater in size than the base section 11.

In an embodiment, the feed hopper section 10 may be largely transparent so as to allow a user to visually determine if the birdfeeder 1 has food 175 (FIG. 3) located in the feed hopper section 10 without the need to open the top 2 of the birdfeeder 1. Further, the transparent nature of the feed hopper 10 may attract birds which may see the food 175 located within the interior of the feed hopper section 10.

In an embodiment, the feed hopper section 10 is made from glass or plastic whereas the base section 11 may be largely made from a durable material such as metal or plastic. Preferably, the entire birdfeeder 1 may be made of durable material so as to withstand prolonged exposure to the elements.

Figure 2:
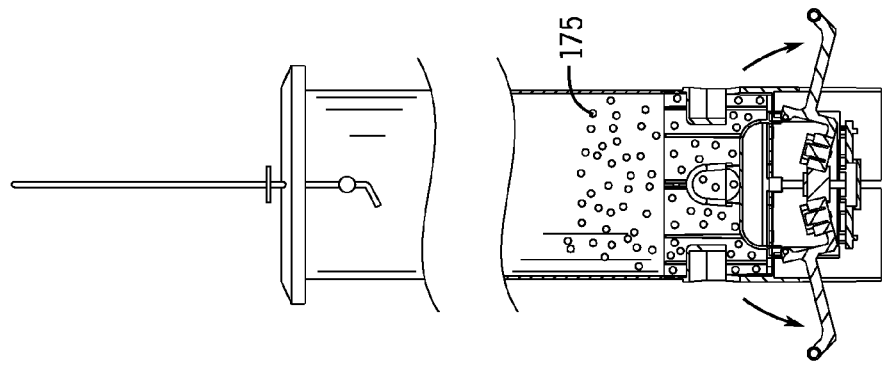
FIG. 2 illustrates a front view of the birdfeeder wherein the movable handle is in the First Position A (horizontal).

The birdfeeder 1 may have a movable handle section 20. The movable handle section 20 may be generally u-shaped and may be in a generally inverted orientation with respect to the birdfeeder 1. The movable handle section 20 may be secured near the top 2 of the birdfeeder 1. The movable handle section 20 may have a generally cylindrical first arm 21 and generally cylindrical second arm 22 wherein the generally cylindrical first arm 21 is attached to the generally cylindrical second arm 22 at a junction 23 and wherein the junction 23 is generally curved upward so as a user may hang the birdfeeder 1 by placing the junction 23 of the movable handle section 20 on a hook, nail or the like 37 (FIG. 2).

Figure 6:
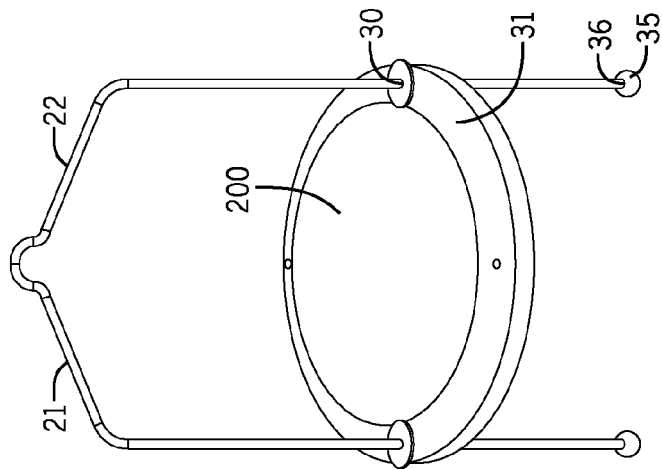
FIG. 6 illustrates a view of the handle of the birdfeeder.

The generally cylindrical first arm 21 and the generally cylindrical second arm 22 may be parallel to each other and generally parallel with respect to the generally cylindrical side 4 of the birdfeeder 1. Further, the generally cylindrical first arm 21 and generally cylindrical second arm 22 may be located approximately one-hundred and eighty degrees apart (on opposite sides) of the birdfeeder 1. The movable handle section 20 may move from a First Position A (FIG. 1) to a Second Position B (FIG. 2). More specifically, the generally cylindrical first arm 21 and generally cylindrical second arm 22 may slide through an opening 30 (FIG. 6) located on a top ridge 31 located at the top 2 of the birdfeeder 1.

Figure 3:
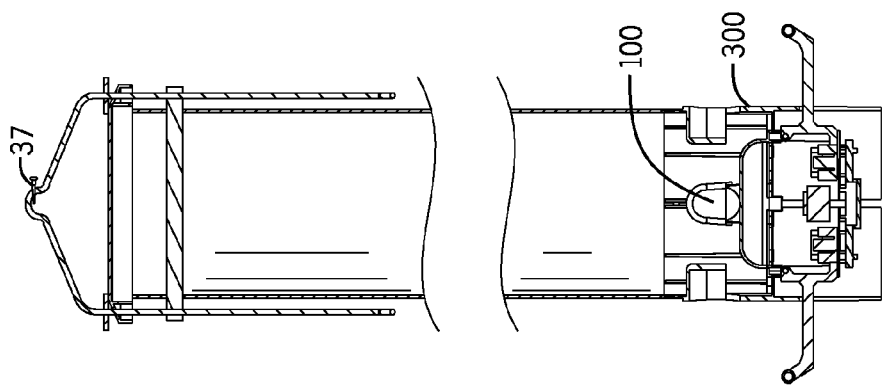
FIG. 3 illustrates a front view of the birdfeeder wherein the movable perch is in the Second Position B (non-horizontal).

In an embodiment, the end of the generally cylindrical first arm 21 and the end of the generally cylindrical second arm 22 may be slightly bent (FIG. 3). The bent end of the generally cylindrical first arm 21 and the bent end of the generally cylindrical second arm 22 may prevent the movable handle section 20 from becoming dislodged from the opening 30 on the top ridge 31 of the birdfeeder 1.

In an alternative embodiment, a bulb 35 (FIG. 6) may be located at a distal end 36 of the generally cylindrical first arm 21 and the generally cylindrical second arm 22. The bulb 35 may have a larger diameter than the diameter of the opening 30 on the top ridge 31 such that the first arm 21 and second arm 22 are prevented from coming off the birdfeeder 1. The movable handle section 20 may be moved from the Second Position B to the First Position A during use and may be returned to the Second Position B for transportation and storage.

Connected to the distal end 36 of the first generally cylindrical arm 21 and the second generally cylindrical arm 22 may be a rod 40 (FIG. 1). In an embodiment, the rod 40 may pass through the feed hopper section 10. Further, in an embodiment, the bale (or "handle") may be connected to the rod 40 on the distal end.

Figure 4:
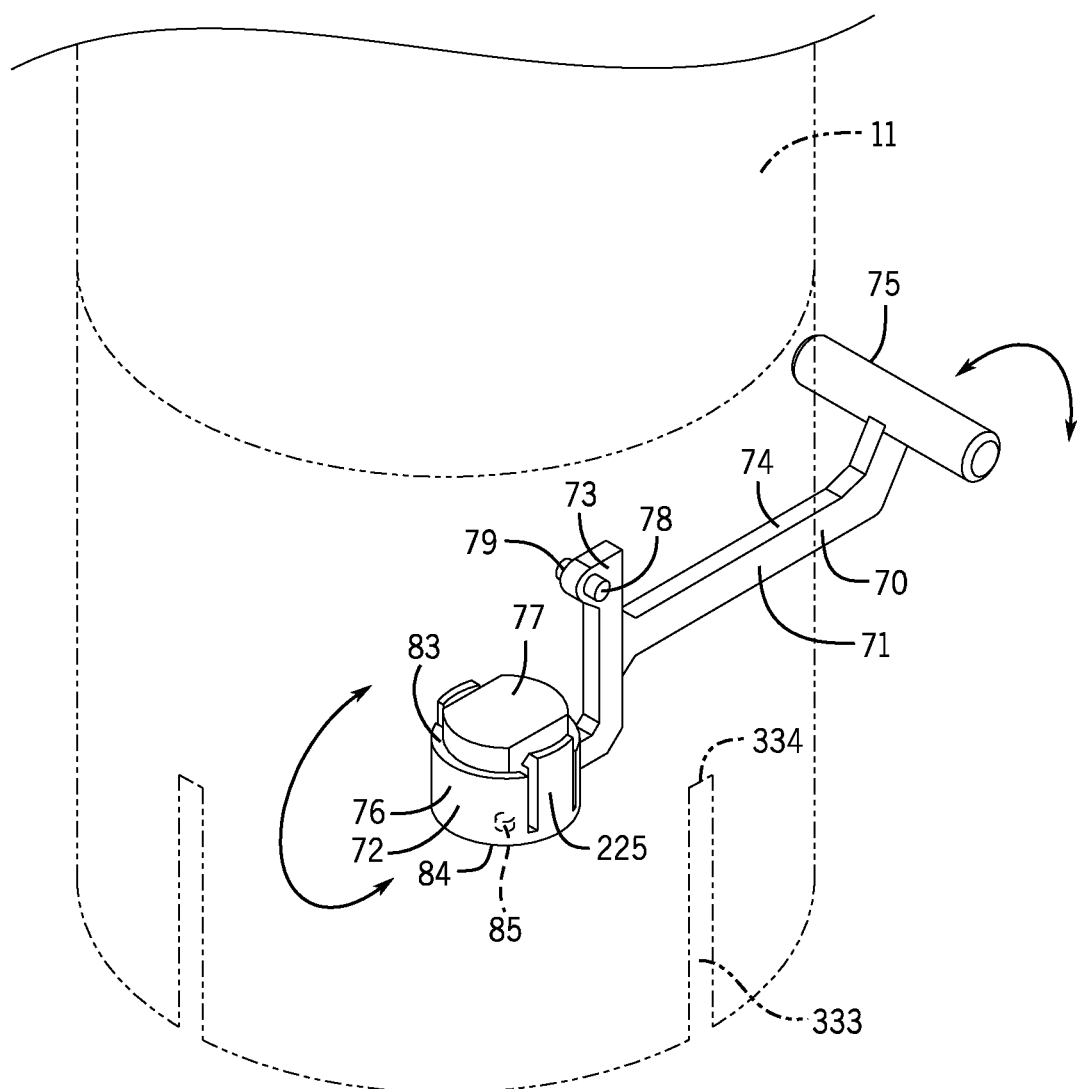
FIG. 4 illustrates a detailed view of the movable perch of the birdfeeder.
Figure 5:
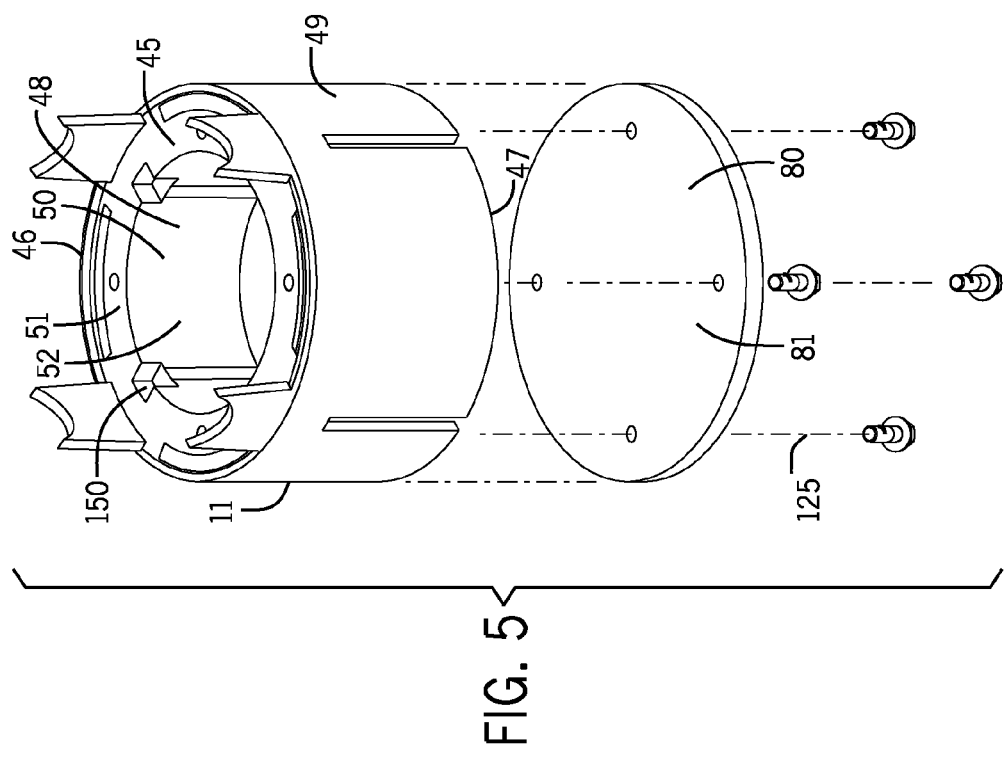
FIG. 5 illustrates a detailed view of the base unit of the birdfeeder.

Referring now to FIG. 5, the base section 11 is further illustrated unattached to the feed hopper section 10. The base section 11 may be generally cylindrical having a diameter substantially similar to a diameter of the feed hopper section 10. In an embodiment, the base section 11 may have a generally stationary support collar 45 and may be connected to a plurality of movable perch units 70 (FIG. 4).

The generally stationary support collar 45 may have a top 46, a bottom 47 and an interior 48. Further, the generally stationary support collar 45 may have an exterior wall 49 which faces outward, away from the birdfeeder 1, and an interior wall 50 facing the interior 48 of the support collar 45. A generally cylindrical ring portion 51 may be located within the interior 48 of the generally stationary support collar 45. The ring portion 51 may extend from near the top 46 of the support collar 45 to approximately forty to sixty percent downward. More specifically, the ring portion 51 may not reach the bottom 47 of the support collar 45. The ring portion 51 may have a generally cylindrical opening 52. The generally cylindrical opening 52 which may allow the movable perch units 70 to move from a First Position A to a Second Position B, as described below.

Located at the bottom 47 of the generally stationary support collar 45 may be a generally metallic plate 80 having an upper surface 81. The generally metallic plate 80 may be magnetic and may cover substantially the entire bottom 47 of the generally stationary support collar 45. The generally metallic plate 80 may be secured to the bottom 47 of the generally stationary support collar 45 by screws, latches or other securing mechanisms 125. A user may remove the screws, latches or other securing mechanisms 125 to gain access to the interior 48 of the support collar 45. Further, a user may remove the generally metallic plate 80 from the support collar 45 so that strong magnet 85 (as described below) located on the movable perch units 70 have nothing to attract to therein rendering the movable perch unit 70 free moving.

Referring again to FIG. 4, the movable perch units 70 are illustrated. The figures illustrate the birdfeeder 1 having four movable perch units 70; however, any number of movable perch units 70 may be implemented. The movable perch units 70 may have a first side 71, a second side 72 and a pivot point 73. The first side 71 of the movable perch unit 70 may be located on the opposite side of the pivot point 73 as the second side 72 of the movable perch unit 70. The first side 71 of the movable perch unit 70 may have an extended bar 74 which extends outward, away from the pivot point 73. At the end of the extended bar 74 may be a generally perpendicular sitting rod 75 wherein the bird would actually sit to feed from the birdfeeder 1.

The second side 72 of the movable perch unit 70 may have a holder 76 which contains a weighted element 77 (such as a steel slug). The second side 72 of the movable perch unit 70 may be slightly greater in weight than the first side 71 such that when the movable perch unit 70 is allowed to rotate around a pin 78 extending through an opening 79 of the pivot point 73, the greater weight of the second side 72 naturally forces the movable perch unit 70 down on the second side 72 and up on the first side 71. Further, the weighted element 77 of the second side 72 may force the second side 72 down so that the second side 72 may contact the upper surface 81 of the metallic plate 80.

The base section 11 of the birdfeeder 1 may have a stationary opening or support loop 150 (FIG. 5) located near the top 46 of the generally stationary support collar 45. The stationary opening or support loop 150 may receive the pin 78 of the pivot point 73 of the movable perch unit 70. More specifically, the pivot point 73 of the movable perch unit 70 may rotate partially around the stationary opening or support loop 150 of the support collar 45.

The holder 76 of the second side 72 of the movable perch unit 70 may have a top 83 and a bottom 84. The weighted element 77 may be secured toward the top 83 of the holder 76. In an embodiment, the weighted element 77 is secured to the top 83 of the holder 76 by, for example, grips 225. The grips 225 may be located on opposite sides of the top 83 of the holder 76 and may be slightly bent outward to receive the weighted element 77 and then allowed to return to their natural state wherein they can secure the weighted element 77 on the top 83 of the holder 76. In an embodiment, a user may alter the weight of the weighted element 77 to allow the user to select the force for which the weighted element 77 will force the second side 72 of the movable perch unit 70 downward; therein controlling the size of the bird which may feed from the birdfeeder 1.

Located on the bottom 84 of each of the holders 76 of the movable perches 70 may be a strong magnet 85. In an embodiment, the strong magnet 85 may have a polarity opposite then that of the upper surface 81 of the metallic plate 80 such that the strong magnet 85 is attracted to the upper surface 81 of the metallic plate 80.

In an embodiment, the strong magnet 85 and/or weighted element 77 may be selectively changed by the user depending on the desired strength of the magnet 85 or weight element 77. More particular, if the user wishes to allow heavier birds, such as starlings, grackles, or blue jays to feed at the birdfeeder 1, the user may switch out the strong magnets 85 and/or weighted element 77 for stronger magnets 85 and/or a heavier weighted element 77. If the user wishes to allow only lighter birds to feed, such as cardinals, the user may switch out the strong magnets 85 for a weaker magnet or weaker weighted element 77. When a weaker magnet 85 and/or lighter weighted element 77 is used less force is required to pull the magnet 85 away from the upper surface 81 of the metallic plate 80. As a result, a lighter bird or animal will trigger the movable perch unit 70 to rotate away from the feed hopper section 10 and the lighter bird or animal cannot reach or feed from the birdfeeder 1

As stated above, the movable perch unit 70 may move from a First Position A (FIG. 1) to a Second Position B (FIG. 3). In an embodiment, the amount of force needed to move the movable perch unit 70 from the First Position A to the Second Position B depends on the force of the magnet 85 and weighted element 77 being generally less than the force on the movable perch unit 70 created from the weight of the desired birds which are encouraged to feed from the feeder 1.

In use, the first side 71 of the movable perch unit 70 is located outside the interior 48 of the generally stationary support collar 45 whereas the second side 72 of the movable perch unit 70 is located (and concealed) within the interior 48 of the generally stationary support collar 45. Locating the second side 72 of the movable perch unit 70 within the interior 48 of the generally stationary support collar 45 protects the magnet 85, the second side 72 of the movable perch unit 70, and the pivot point of the movable perch unit 70 from damage from the elements.

A plurality of openings 100 (FIG. 2) may be present on the exterior surface of the feed hopper section 10. The openings 100 may allow access to the interior 200 (FIG. 6) of the feed hopper 10 so as a bird may access the food 175 located within the interior 200 of the feed hopper 10 through the openings 100. Each opening 100 may be located just above the first side 71 of the moveable perch unit 70 when the movable perch unit 70 is located in the First Position A. More specifically, the opening 100 may be located, for example, a few inches above the generally perpendicular sitting rod 75 of the first side 71 of the movable perch unit 70 when the movable perch unit 70 is located in the First Position A. When the movable perch unit 70 is located in the Second Position B, the generally perpendicular sitting rod 75 of the first side 71 of the movable perch unit 70 is moved downward so that the distance from the generally perpendicular sitting rod 75 to the opening 100 of the feed hopper 10 is greatly increased. As a result, a large bird or heavy animal sitting on the extended bar 74 cannot reach the opening 100 so as to access the food 175 located in the feed hopper 10.

Referring now to FIG. 4, the base unit 11 may have a generally rectangular slit 333. The generally rectangular slit 333 may extend to the bottom 2 of the birdfeeder 1. The generally rectangular slit 333 may be largely parallel with respect to the side 4 of the birdfeeder 1. The generally rectangular slit 333 may allow a portion of the first side 71 of the movable perch unit 70 to extend outside of the base unit 11 and may allow a portion of the first side 71 to move from the First Position A to the Second Position B. The top 334 of the generally rectangular slit 333 may prevent the first side 71 of the movable perch unit 70 from extending upward beyond a desired position (and thus too close to the opening 100 of the fed hopper section 10).

Figure 7:
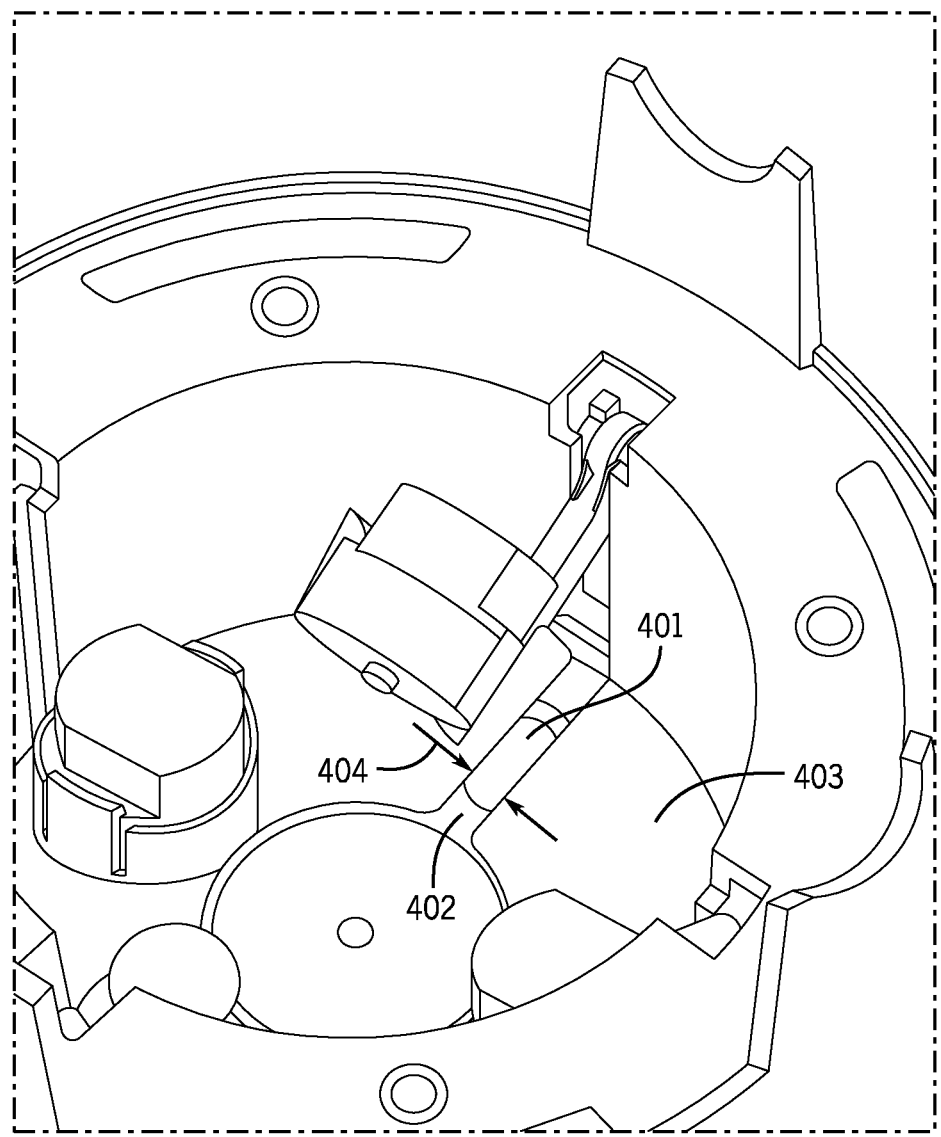
FIG. 7 illustrates an embodiment of the bottom of the base of the birdfeeder.

Referring now to FIG. 7, an alternative embodiment of the bottom of the base unit 11 is provided. In this embodiment, the upper surface 81 of the generally metallic plate 80 may not be magnetic. Instead, a separate magnet is provided 401. In particular, the bottom 403 of the base unit 11 may have a slit 402 having a diameter 404. A strong magnet 401 may be located below the slit 402. The slit 402 may allow the magnet 85 of the second side 72 of the movable perch 70 to more easily be attracted to the magnet 401 of the embodiment of FIG. 7.

The diameter 404 of the slit 402 may be less than a diameter of the magnet 401 such that the magnet 401 may not fall out of the slit 402 and is instead secured beneath the bottom 403 of the base unit 11. The magnet 401 may have an orientation having an opposite polarity as the magnet 85 of the movable perch section 70 such that the magnet 85 of the movable perch unit 70 is attracted to the magnet 401 of the bottom 403 of the base unit 11. In this embodiment, the mechanics work as similar to as stated above wherein if a greater pressure (created from the weight of a large bird or animal) is placed on the first side 71 of the movable perch unit 70 the first side 7 of the movable perch unit 70 will overcome the attraction of the two magnets forcing the first side 71 of the movable perch unit 11 downward wherein the large bird or animal will not be able to feed.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

We claim:

1. A birdfeeder having a movable perch comprising:
 a generally hollow feed hopper section having a top, a bottom, an exterior surface and an interior;
 a base portion having a top, a metallic bottom, an exterior surface, and an interior wherein the generally hollow feed hopper section is located above and secured to the base portion;
 at least one movable perch wherein the movable perch has a first side, a second side and a pivot point wherein the movable perch is partially secured within the base portion and wherein the movable perch moves from a first position to a second position;
 wherein the second side of the movable perch has a top and a bottom; and
 wherein a first magnet is secured to the bottom of the second side of the movable perch and wherein the first magnet is attracted to the metallic bottom of the base portion and temporarily secures the second side of the movable perch in a first position.

2. The birdfeeder of claim 1 wherein the generally hollow feed hopper is cylindrical.

3. The birdfeeder of claim 1 wherein the pivot point of the movable perch has a pin and wherein the pin is secured within the base portion.

4. The birdfeeder of claim 3 further comprising:
 a removable weight located on the top of the second side of the movable perch wherein the removable weight may be exchanged with a second removable weight so as to control the amount of force need to allow the movable perch to pivot around the pin of the pivot point.

5. The birdfeeder of claim 4 further comprising:
 a clamp on the second side of the movable perch wherein the clamp temporarily secures the removable weight.

6. The birdfeeder of claim 1 further comprising:
 an extended support bar on the first side of the movable perch; and
 a sitting rod which receives a bird wherein the sitting rod is substantially perpendicular to the extended support bar.

7. The birdfeeder of claim 6 wherein the force required to separate the first magnet of the bottom of the second side of the perch from the metallic bottom of the base portion is overcome when a predetermined desired weight forces down on the sitting rod of the first side of the movable perch is reached.

8. The birdfeeder of claim 1 further comprising:
 an elongated slit on the exterior surface of the base portion wherein the first side of the movable perch may move from the first position to the second position within the elongated slit of the exterior surface of the base portion.

9. The birdfeeder of claim 1 further comprising:
 an opening on the exterior surface of the generally hollow feed hopper section wherein the opening allows a bird to access a food item located within the generally hollow feed hopper.

10. The birdfeeder of claim 9 further comprising:
 an extended support bar on the first side of the movable perch;
 a sitting rod which receives a bird wherein the sitting rod is substantially perpendicular to the extended support bar; and
 wherein the movement of the movable perch from the first position to the second position moves the sitting rod away from the opening on the exterior surface of the generally hollow feed hopper section and prevents a bird or animal from reaching the opening on the exterior surface of the generally hollow feed hopper.

11. The birdfeeder of claim 1 further comprising:
 a handle secured to the top of the birdfeeder wherein the handle moves from a first position to a second position and wherein the birdfeeder is hung by the handle.

12. A birdfeeder having a movable perch comprising:
 a generally hollow feed hopper section having a top, a bottom, an exterior surface and an interior;
 a base portion having a top, a bottom, an exterior surface, and an interior wherein the generally hollow feed hopper section is located above and secured to the base portion;
 at least one movable perch wherein the movable perch has a first side, a second side and a pivot point wherein the movable perch is partially secured within the base portion and wherein the movable perch moves from a first position to a second position;
 wherein the second side of the movable perch has a top and a bottom;
 a first magnet secured to the bottom of the second side of the movable perch;
 a second magnet secured to an upper surface of the bottom of the base portion wherein the second magnet has a polarity orientation so as to attract the first magnet of the bottom of the second side of the perch; and
 a slit located on the bottom of the base portion wherein the second magnet is located beneath the slit and wherein the second magnet may not pass through the slit and wherein the first magnet of the second side of the movable perch is attracted to the second magnet of the bottom of the base portion.

* * * * *